(12) United States Patent
Shi et al.

(10) Patent No.: US 9,937,670 B2
(45) Date of Patent: Apr. 10, 2018

(54) THREE-DIMENSIONAL RAPID PROTOTYPING APPARATUS AND POWDER FILTERING MECHANISM THEREOF

(71) Applicant: MICROJET TECHNOLOGY CO., LTD., Hsinchu (TW)

(72) Inventors: Kwo-Yuan Shi, Hsinchu (TW); Chih-Kai Chen, Hsinchu (TW); Jheng-Bin Chen, Hsinchu (TW)

(73) Assignee: Microjet Technology Co., Ltd., Hsinchu (TW)

( * ) Notice: Subject to any disclaimer, the term of this patent is extended or adjusted under 35 U.S.C. 154(b) by 284 days.

(21) Appl. No.: 15/049,741

(22) Filed: Feb. 22, 2016

(65) Prior Publication Data

US 2016/0271885 A1 Sep. 22, 2016

(30) Foreign Application Priority Data

Mar. 16, 2015 (TW) .............................. 104108383 A (51) Int. Cl.
*B29C 64/357* (2017.01)
*B29C 64/20* (2017.01)
(Continued)

(52) U.S. Cl.
CPC ...... *B29C 67/0096* (2013.01); *B01D 53/0407* (2013.01); *B29C 64/165* (2017.08);
(Continued)

(58) Field of Classification Search
USPC ....................................................... 425/217
See application file for complete search history.

(56) References Cited

U.S. PATENT DOCUMENTS

| 2010/0247703 A1* | 9/2010 | Shi | ................ | B29C 64/165 425/375 |
| 2010/0247742 A1* | 9/2010 | Shi | ................ | C23C 24/04 427/8 |

(Continued)

FOREIGN PATENT DOCUMENTS

| TW | 201036689 | 10/2010 |
| TW | 201036805 | 10/2010 |

(Continued)

*Primary Examiner* — Jacob T Minskey
*Assistant Examiner* — Baileigh K Darnell
(74) *Attorney, Agent, or Firm* — Kirton McConkie; Evan R. Witt (57) ABSTRACT

A powder filtering mechanism includes a connecting part, a main body, a duct, a suction device and a bracket. The connecting part is in communication with a powder inlet. Moreover, plural filters are disposed within an accommodation space of the main body. The suction device is in communication with the main body. The bracket supports a micro-particle adsorption structure. During operation of the suction device, flying dust of excess construction powder is inhaled into the powder inlet, and a portion of the flying dust is transferred to the accommodation space. After the portion of the flying dust is filtered by the plural filters in multiple filtering steps, micro-particles of flying dust passing through the plural filters are transferred to the micro-particle adsorption structure so as to be adsorbed by the micro-particle adsorption structure.

14 Claims, 7 Drawing Sheets

(51) Int. Cl.
    *B29C 67/00*     (2017.01)
    *B01D 53/04*     (2006.01)
    *B33Y 30/00*     (2015.01)
    *B33Y 40/00*     (2015.01)
    *B29C 64/35*     (2017.01)
    *B29C 64/165*     (2017.01)
    *B03C 3/017*     (2006.01)
    *B29K 105/00*     (2006.01)
    *B29K 105/26*     (2006.01)

(52) U.S. Cl.
    CPC .............. *B29C 64/20* (2017.08); *B29C 64/35* (2017.08); *B29C 64/357* (2017.08); *B29C 67/0081* (2013.01); *B33Y 30/00* (2014.12); *B33Y 40/00* (2014.12); *B01D 2253/102* (2013.01); *B03C 3/017* (2013.01); *B29K 2105/251* (2013.01); *B29K 2105/26* (2013.01)

(56) References Cited

U.S. PATENT DOCUMENTS

2011/0300248 A1* 12/2011 Tung ...................... B33Y 30/00
                                                                                                425/90
2012/0052145 A1* 3/2012 Chen ........................ B08B 5/02
                                                                                              425/217

FOREIGN PATENT DOCUMENTS

| TW | 201116328 | | 5/2011 |
| TW | 201116328 A | * | 5/2011 |
| TW | 201330941 | | 8/2013 |

\* cited by examiner

THREE-DIMENSIONAL RAPID PROTOTYPING APPARATUS AND POWDER FILTERING MECHANISM THEREOF

FIELD OF THE INVENTION

The present invention relates to a powder filtering system, and more particularly to a powder filtering mechanism for a three-dimensional rapid prototyping apparatus.

BACKGROUND OF THE INVENTION

As known, a rapid prototyping (RP) technology is developed from the concepts of forming a pyramid by stacking layers, and the main technical feature is to achieve fast formation. A complicated design can be transformed into a three-dimensional physical model automatically and fast without any cutting tools, molds and fixtures. Thus, the development cycle of new products and research and development cost are largely reduced to ensure the time to market for new products and the first-time-right ratio. Accordingly, a complete and convenient product design tool is provided between technicians and non-technicians (e.g. managers and users), and the product competitiveness and the quick reaction capability of enterprises in the market are improved obviously.

Recently, the rapid prototyping technology develops a method for producing three-dimensional physical models by combining jet printing and precise positioning of carriers. The producing method begins by first spreading a layer of powder on the carrier and then printing high viscosity liquid binder on part of the powder by using jet printing technology, so that the liquid binder and the powder stick together to become solidified. After the above steps are repeatedly done, a three-dimensional physical model is produced by stacking multiple layers.

Since the processes of spreading powder, printing and taking out the finished product are manually performed according to the conventional rapid prototyping technology, the flying dust usually pollutes the working environment and contaminates the whole three-dimensional rapid prototyping apparatus. For maintaining normal operation, a dust-collecting and cleaning task is manually done after a specified stage of the rapid prototyping technology. However, during the cleaning process, the finished product is possibly destroyed or the components of the rapid prototyping apparatus are possibly damaged because of carelessness. Moreover, the increased frequency of performing the cleaning process is labor-intensive, time-consuming and costly. If the frequency of performing the cleaning process decreases, the dust pollution problem cannot be effectively solved.

Figure 1:
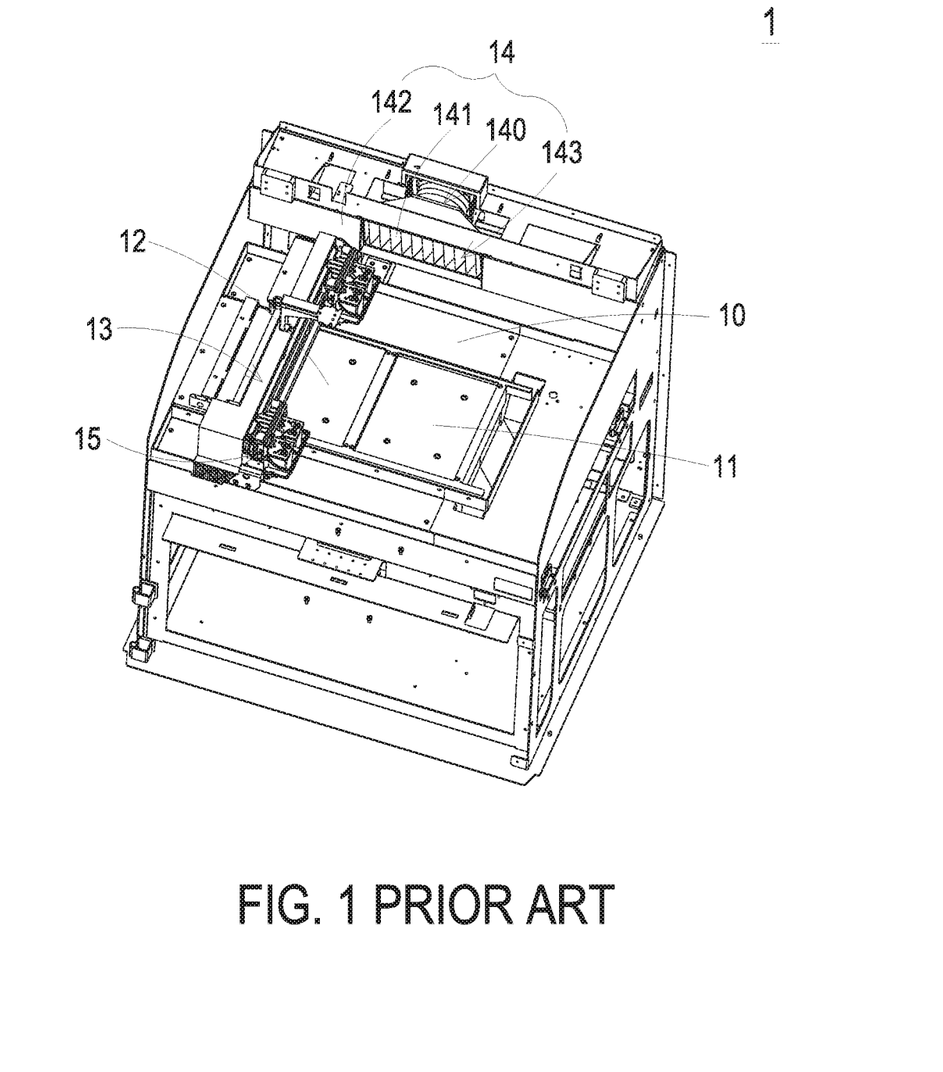
FIG. 1 is a schematic perspective view illustrating a conventional three-dimensional rapid prototyping apparatus.

Another rapid prototyping technology will be illustrated with reference to FIG. 1. FIG. 1 is a schematic perspective view illustrating a conventional three-dimensional rapid prototyping apparatus. The conventional three-dimensional rapid prototyping apparatus 1 comprises a construction platform 10, a construction chamber 11, a powder feeder 12, a movable platform 13 and a powder filtering mechanism 14. The construction chamber 11 and the powder feeder 12 are embedded in the construction platform 10. A printing module 15 is installed on the movable platform 13. Consequently, the printing module 15 is synchronously moved with the movable platform 13 back and forth. As the printing module 15 is moved with the movable platform 13 to a position over the construction chamber 11, the printing module 15 prints liquid binder or ink on the construction powder which is accommodated within the construction chamber 11. Consequently, a rapid prototyping process is performed. Moreover, the flying dust of the excess construction powder from the construction platform 10 is filtered by the powder filtering mechanism 14. The powder filtering mechanism 14 is located beside the construction platform 10. Conventionally, the powder filtering mechanism 14 comprises a fan 140, plural filters 141 and two coupling plates 142. By means of the coupling plates 142, the powder filtering mechanism 14 is fixed at a lateral side of the construction platform 10. Moreover, an opening 143 is defined by the two coupling plates 142 and the construction platform 10. The plural filters 141 are disposed within the opening 143. The fan 140 is behind the plural filters 141. During operation of the fan 140, negative pressure airflow is provided. Consequently, the flying dust of the excess construction powder from the construction platform 10 is inhaled into the opening 143 of the powder filtering mechanism 14. After the flying dust is filtered by the plural filters 141, the flying dust will not be exhausted out of the three-dimensional rapid prototyping apparatus 1. Consequently, the possibility of polluting the working environment by the flying dust will be reduced.

However, since the opening 143 is open to the construction platform 10, some problems possibly occur. For example, if the flying dust filtered by the filters 141 smells unpleasant, unpleasant odor may diffuse to the working environment. Moreover, due to the arrangement of the powder filtering mechanism 14 and the opening 143, it is difficult to collect and filter the flying dust at the corners of the three-dimensional rapid prototyping apparatus 1. In other words, the powder filtering mechanism 14 cannot effectively filter the flying dust and remove the unpleasant odor of the flying dust.

Therefore, there is a need of providing an improved powder filtering system for a rapid prototyping apparatus in order to overcome the above drawbacks.

SUMMARY OF THE INVENTION

The present invention provides a powder filtering mechanism for filtering the flying dust from a three-dimensional rapid prototyping apparatus in order to overcome the drawbacks of the conventional technologies.

The present invention provides a powder filtering mechanism with a suction device, a shielding part, a brush structure, a sealed main body and the plural filters. The suction device is used for providing negative pressure airflow. The shielding part, the brush structure, the sealed main body and the plural filters are effective to absorb and filter the flying dust in the working environment. By using the powder filtering mechanism of the present invention, the problem of generating the flying dust in the working environment of the three-dimensional rapid prototyping apparatus will be overcome, and the unpleasant odor of the flying dust can be effectively eliminated.

In accordance with an aspect of the present invention, there is provided a three-dimensional rapid prototyping apparatus. The three-dimensional rapid prototyping apparatus includes a construction platform, a movable platform, a printing module, a powder inlet, an excess powder collector, and a powder filtering mechanism. The construction platform includes a construction chamber and a powder feeder. The movable platform is disposed over the construction platform. When the movable platform is moved relative to the construction platform, construction powder is pushed from the powder feeder to the construction chamber. The printing module is disposed on the movable platform. When the printing module is moved with the movable platform to a position over the construction chamber, a rapid prototyping process is performed in the construction chamber. The powder inlet is exposed to the construction platform. The excess powder collector is in communication with the powder inlet. After the rapid prototyping process is completed, excess construction powder is collected by the excess powder collector. The powder filtering mechanism includes a connecting part, a main body, a duct, a suction device and a bracket. The connecting part is in communication with the powder inlet. The main body includes an outer shell, an entrance and an exit. An accommodation space is defined within the outer shell. Moreover, plural filters are accommodated within the accommodation space. The duct is in communication with the connecting part and the entrance of the main body. The suction device is in communication with the exit of the main body. The bracket is connected with a bottom surface of the main body. A micro-particle adsorption structure is supported by the bracket. During operation of the suction device, flying dust of the excess construction powder is inhaled into the powder inlet, and a portion of the flying dust is transferred to the accommodation space of the main body through the connecting part and the duct. After the portion of the flying dust is introduced into the accommodation space of the main body, the portion of the flying dust is filtered by the plural filters in multiple filtering steps, and micro-particles of flying dust passing through the plural filters are transferred to the micro-particle adsorption structure through the exit of the main body and the suction device so as to be adsorbed by the micro-particle adsorption structure.

In accordance with another aspect of the present invention, there is provided a powder filtering mechanism for filtering flying dust from a three-dimensional rapid prototyping apparatus. The powder filtering mechanism includes a connecting part, a main body, a duct, a suction device and a bracket. The connecting part is in communication with a powder inlet of the three-dimensional rapid prototyping apparatus. The main body includes an outer shell, an entrance and an exit. An accommodation space is defined within the outer shell. Moreover, plural filters are accommodated within the accommodation space. The duct is in communication with the connecting part and the entrance of the main body. The suction device is in communication with the exit of the main body. The bracket is connected with a bottom surface of the main body. A micro-particle adsorption structure is supported by the bracket. During operation of the suction device, the flying dust is inhaled into the powder inlet, and a portion of the flying dust is transferred to the accommodation space of the main body through the connecting part and the duct. After the portion of the flying dust is introduced into the accommodation space of the main body, the portion of the flying dust is filtered by the plural filters in multiple filtering steps, and micro-particles of flying dust passing through the plural filters are transferred to the micro-particle adsorption structure through the exit of the main body and the suction device so as to be adsorbed by the micro-particle adsorption structure.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 2:
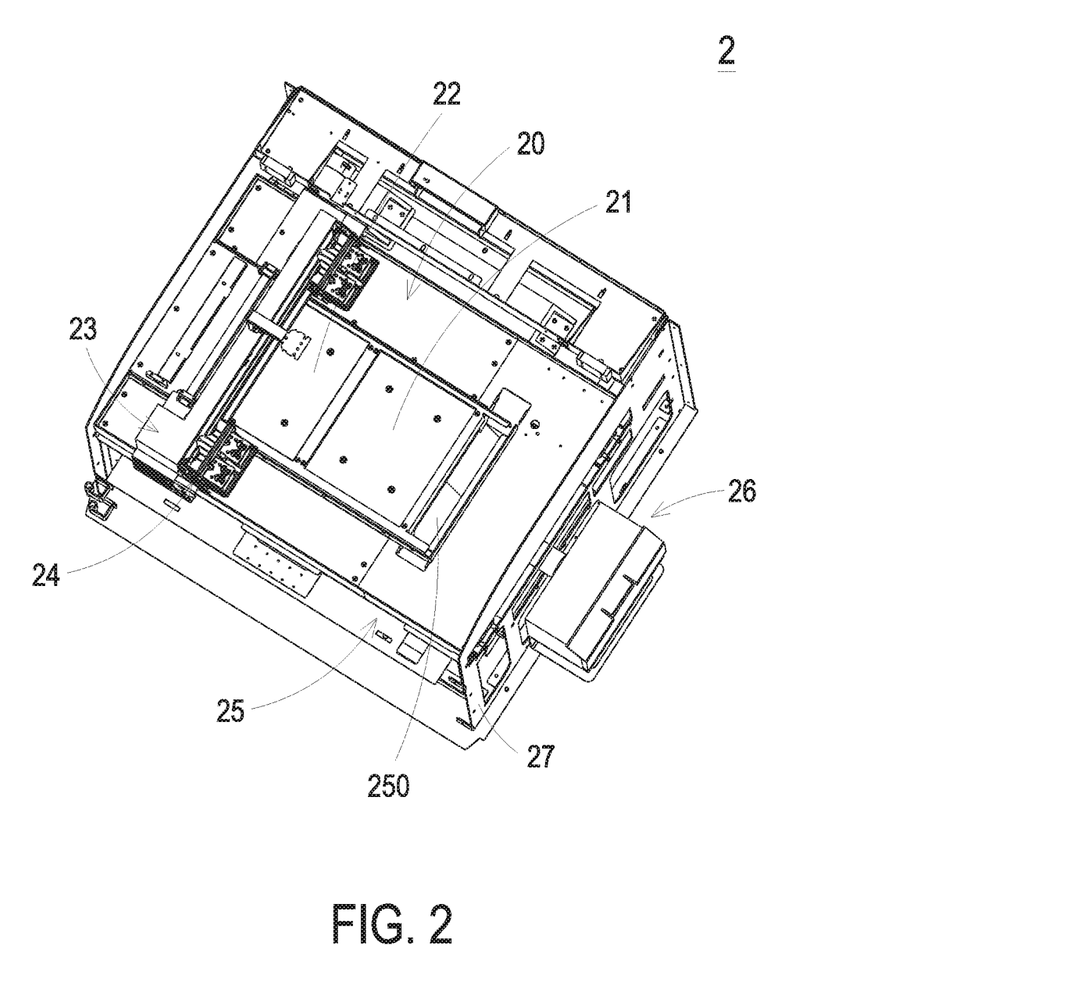
FIG. 2 is a schematic perspective view illustrating a three-dimensional rapid prototyping apparatus according to an embodiment of the present invention.

FIG. 2 is a schematic perspective view illustrating a three-dimensional rapid prototyping apparatus according to an embodiment of the present invention. Preferably but not exclusively, the three-dimensional rapid prototyping apparatus 2 is a floor-type rapid prototyping apparatus. In an embodiment, the three-dimensional rapid prototyping apparatus 2 is equipped with a covering member (not shown). Consequently, an inner space is defined between the three-dimensional rapid prototyping apparatus 2 and the covering member. In another embodiment, the three-dimensional rapid prototyping apparatus 2 is open to the environment. The three-dimensional rapid prototyping apparatus 2 is used for constructing a three-dimensional physical model.

The three-dimensional rapid prototyping apparatus 2 comprises a construction platform 20, a construction chamber 21, a powder feeder 22, a movable platform 23, the printing module 24, an excess powder collector 25 and a powder filtering mechanism 26. The construction platform 20 is installed on a construction base 27. In this embodiment, the construction chamber 21 and the powder feeder 22 are embedded in the construction platform 20. That is, the powder feeder 22 is an underfeed container. In some other embodiments, the powder feeder is a top-feed container. The movable platform 23 is disposed over the construction platform 20. When the movable platform 23 is horizontally moved relative to the construction platform 20, construction powder is pushed from the powder feeder 22 to the construction chamber 21. A printing module 24 is disposed on the movable platform 23. Consequently, the printing module 24 is synchronously moved with the movable platform 23 back and forth. As the printing module 24 is moved with the movable platform 23 to a position over the construction chamber 21, the printing module 24 prints liquid binder or ink on the construction powder which is accommodated within the construction chamber 21. Consequently, a rapid prototyping process is performed.

Figure 3A:
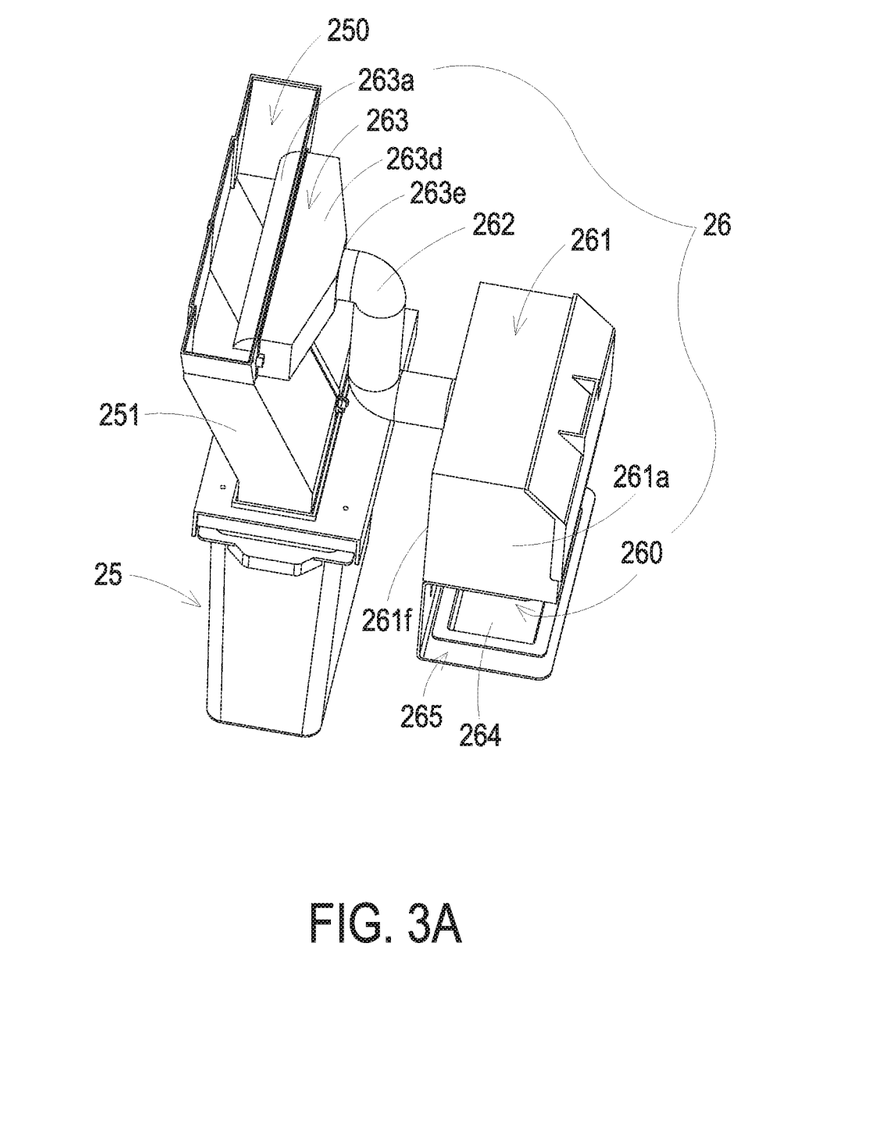
FIG. 3A is a schematic perspective view illustrating the excess powder collector and the powder filtering mechanism of the three-dimensional rapid prototyping apparatus as shown in FIG. 2.

FIG. 3A is a schematic perspective view illustrating the excess powder collector and the powder filtering mechanism of the three-dimensional rapid prototyping apparatus as shown in FIG. 2. The excess powder collector 25 is disposed within the construction base 27. The excess powder collector 25 is in communication with an inner space of the three-dimensional rapid prototyping apparatus 2 through a powder inlet 250 and a communication tube 251. The powder inlet 250 is exposed to the construction platform 20 and located beside the construction chamber 21. After the rapid prototyping process is completed, the excess construction powder is pushed by a powder-spreading mechanism (not shown), which is linked with the movable platform 23. Consequently, the excess construction powder is pushed from the construction chamber 21 to the powder inlet 250. After the excess construction powder is introduced into the powder inlet 250, the excess construction powder falls down to the bottom of the excess powder collector 25 through the communication tube 251.

Figure 3B:
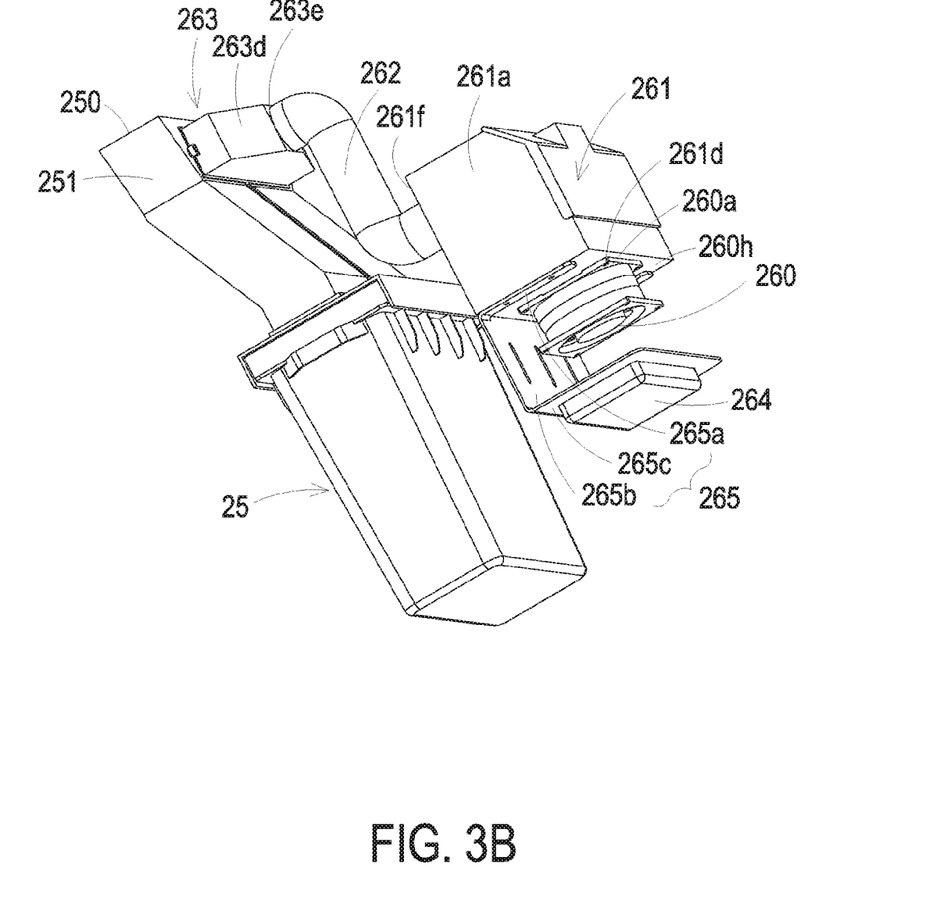
FIG. 3B is a schematic perspective view illustrating the excess powder collector and the powder filtering mechanism of FIG. 3A and taken along another viewpoint.
Figure 3C:
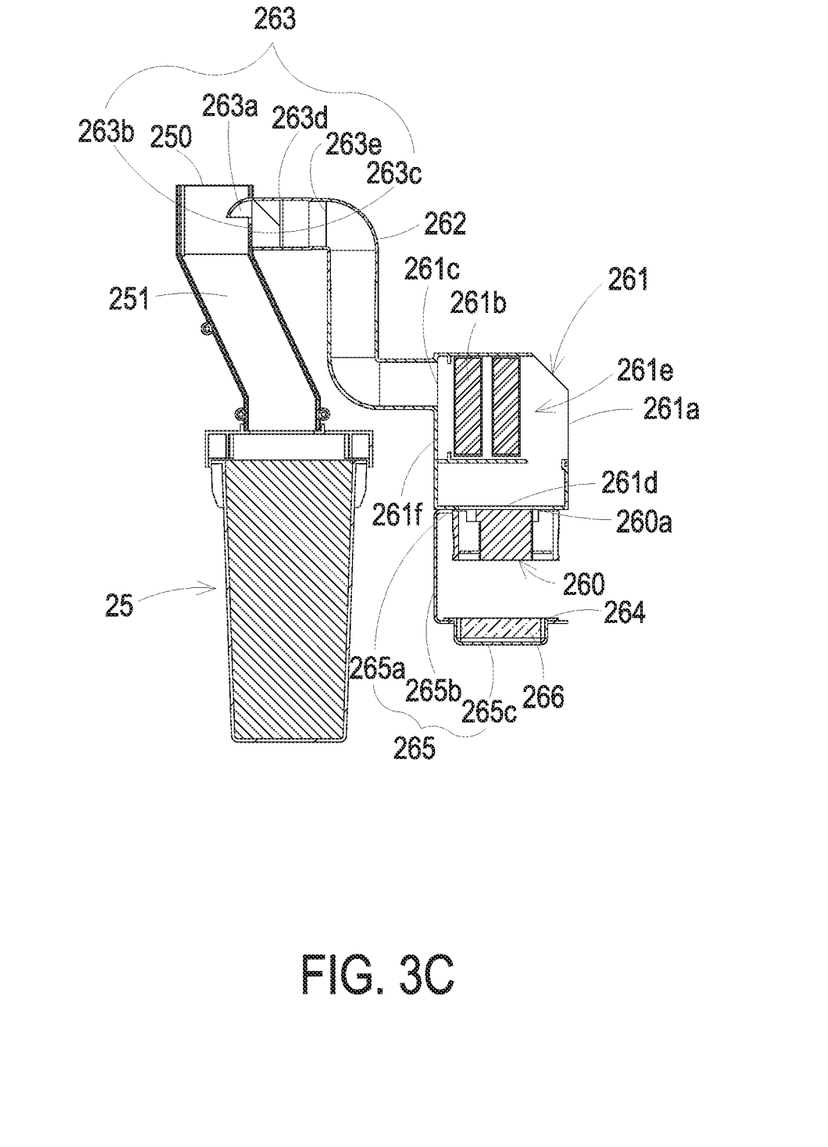
FIG. 3C is a schematic cross-sectional view illustrating the excess powder collector and the powder filtering mechanism of FIG. 3A.

FIG. 3B is a schematic perspective view illustrating the excess powder collector and the powder filtering mechanism of FIG. 3A and taken along another viewpoint. FIG. 3C is a schematic cross-sectional view illustrating the excess powder collector and the powder filtering mechanism of FIG. 3A. Please refer to FIGS. 3A, 3B and 3C. The powder filtering mechanism 26 is in communication with the powder inlet 250 and the communication tube 251. In this embodiment, the powder filtering mechanism 26 comprises a suction device 260, a main body 261, a duct 262, a connecting part 263, a support tray 264 and a bracket 265. The suction device 260 is disposed under the main body 261 (see FIG. 3B). An example of the suction device 260 includes but is not limited to a fan. An airflow inlet 260a of the suction device 260 is in communication with an exit 261d at a bottom surface 261h of the main body 261. The main body 261 is substantially a sealed structure. The main body 261 is only in communication with the suction device 260 and the duct 262. In addition, the main body 261 is in communication with the communication tube 251 through the duct 262 and the connecting part 263. During operation of the suction device 260, the airflow is sucked from airflow inlet 260a of the suction device 260. Consequently, the main body 261, the duct 262 and the connecting part 263 are in a negative pressure state. Under this circumstance, the flying dust or pollutant from the three-dimensional rapid prototyping apparatus 2 is introduced into the powder filtering mechanism 26 through the powder inlet 250 and the connecting part 263 and subjected to multiple filtering steps.

Please refer to FIG. 3C again. The powder filtering mechanism 26 is in communication with the communication tube 251 through the connecting part 263. The connecting part 263 comprises a suction port 263b and a casing 263d. The suction port 263b is located at a first end of the casing 263d, and installed in a sidewall of the communication tube 251. Preferably but not exclusively, the casing 263d is a trapezoid-shaped or a hopper-shaped structure. The suction port 263b is located along a long side of the casing 263d, and the length of the suction port 263b is substantially equal to the length of the long side of the casing 263d. Consequently, a great amount of the suspended dust or pollutant can be introduced into the powder filtering mechanism 26 through the suction port 263b. An opening 263e is located at a second end of the casing 263d, wherein the second end of the casing 263d and the first end of the suction port 263b are opposed to each other. The opening 263e is coupled with the duct 262. Consequently, the connecting part 263 is in communication with the duct 262.

In some embodiments, a shielding part 263a is protruded from a top edge of the suction port 263b of the connecting part 263. The larger-sized powdery particles of the flying dust or pollutant introduced into the powder inlet 250 are blocked by the shielding part 263a. Consequently, the larger-sized powdery particles of the flying dust or pollutant are not introduced into the powder filtering mechanism 26. That is, the larger-sized powdery particles of the flying dust or pollutant fall down to the bottom of the excess powder collector 25 through the communication tube 251.

In some embodiments, a brush structure 263c is located at the suction port 263b of the connecting part 263. The larger-sized powdery particles of the flying dust or pollutant introduced into the powder inlet 250 are further blocked by the brush structure 263c. Consequently, only the smaller-sized powdery particles of the flying dust or pollutant are allowed to be introduced into the powder filtering mechanism 26 through the suction port 263b of the connecting part 263.

Please refer to FIGS. 3A, 3B and 3C again. A first end of the duct 262 is in communication with the opening 263e of the connecting part 263. A second end of the duct 262 is in communication with the entrance 261c of the main body 261. Preferably but not exclusively, the diameter of the duct 262 is substantially equal to the diameter of the opening 263e of the connecting part 263 and the diameter of the entrance 261c of the main body 261.

As shown in FIG. 3C, the main body 261 of the powder filtering mechanism 26 is a sealed structure with an outer shell 261a, an entrance 261c and the exit 261d. The entrance 261c is formed in a lateral surface 261f of the outer shell 261a. Moreover, the entrance 261c is in communication with the duct 262 for allowing the flying dust or pollutant to enter. The exit 261d is formed in the bottom surface 261h of the outer shell 261a. Moreover, the exit 261d is in communication with the airflow inlet 260a of the suction device 260. An accommodation space 261e is defined within the outer shell 261a. Moreover, plural filters 261b are accommodated within the accommodation space 261e. The installation positions of plural filters 261b are determined according to the entrance 261c of the main body 261. Consequently, after the flying dust or pollutant is introduced into the main body 261 through the connecting part 263, the duct 262 and the entrance 261c, the flying dust or pollutant is filtered by the plural filters 261b in multiple filtering steps. The microparticles of the flying dust or pollutant passing through the plural filters 261b are outputted from the exit 261d of the main body 261.

Figure 4A:
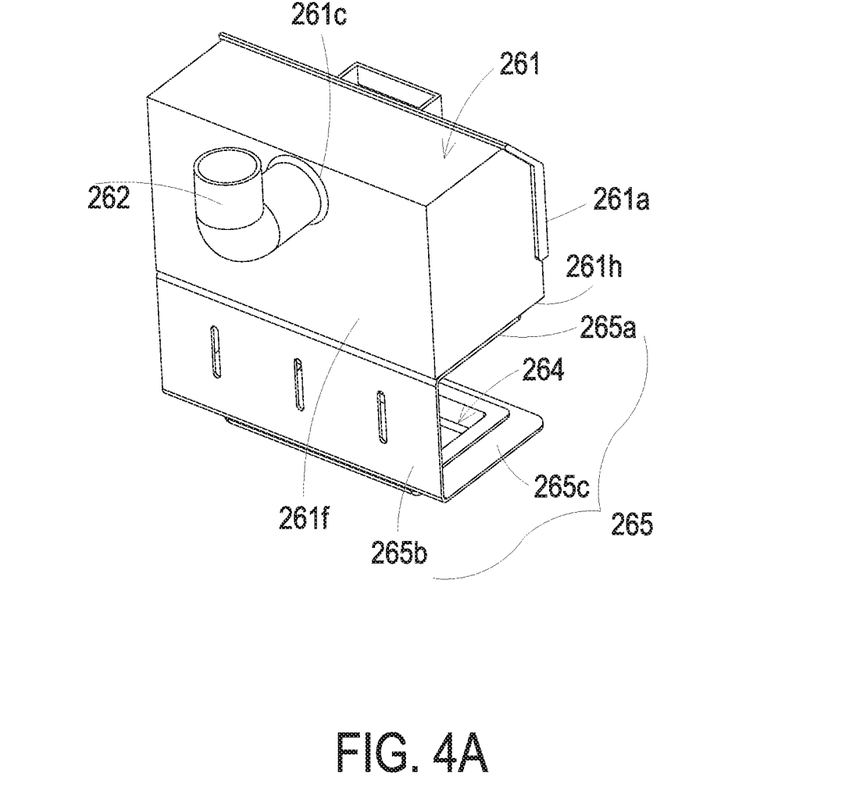
FIG. 4A is a schematic perspective view illustrating the main body and the bracket of the powder filtering mechanism as shown in FIG. 3A.

FIG. 4A is a schematic perspective view illustrating the main body and the bracket of the powder filtering mechanism as shown in FIG. 3A. Please refer to FIGS. 3A, 3B, 3C and 4A. The bottom surface 261h of the outer shell 261a of the main body 261 is connected with the suction device 260. Moreover, the bracket 265 is further connected with the bottom surface 261h of the outer shell 261a of the main body 261. Preferably but not exclusively, the bracket 265 is a U-shaped structure with two support arms 265a, a lateral plate 265b and a bottom plate 265c. The lateral plate 265b is connected with the two support arms 265a and the bottom plate 265c. The two support arms 265a are in parallel with the bottom plate 265c. In this embodiment, the two support arms 265a are vertically protruded from the top edge of the lateral plate 265b, and connected with the bottom surface 261h of the outer shell 261a of the main body 261. The lateral plate 265b is substantially coplanar with the lateral surface 261f of the outer shell 261a. The support tray 264 is disposed on the bottom plate 265c. In an embodiment, the bottom plate 265c has a concave structure for receiving the support tray 264.

In an embodiment, a micro-particle adsorption structure 266 is supported by the support tray 264 (see FIG. 3C). An example of the micro-particle adsorption structure 266 includes but is not limited to a moisture-containing fiber structure. Due to the interaction between moisture and the fiber structure, the micro-particles of the flying dust or pollutant passing through the plural filters 261b are absorbed by the micro-particle adsorption structure 266. Consequently, the flying dust in the working environment is largely reduced, and the dust pollution problem is effectively solved.

Figure 4B:
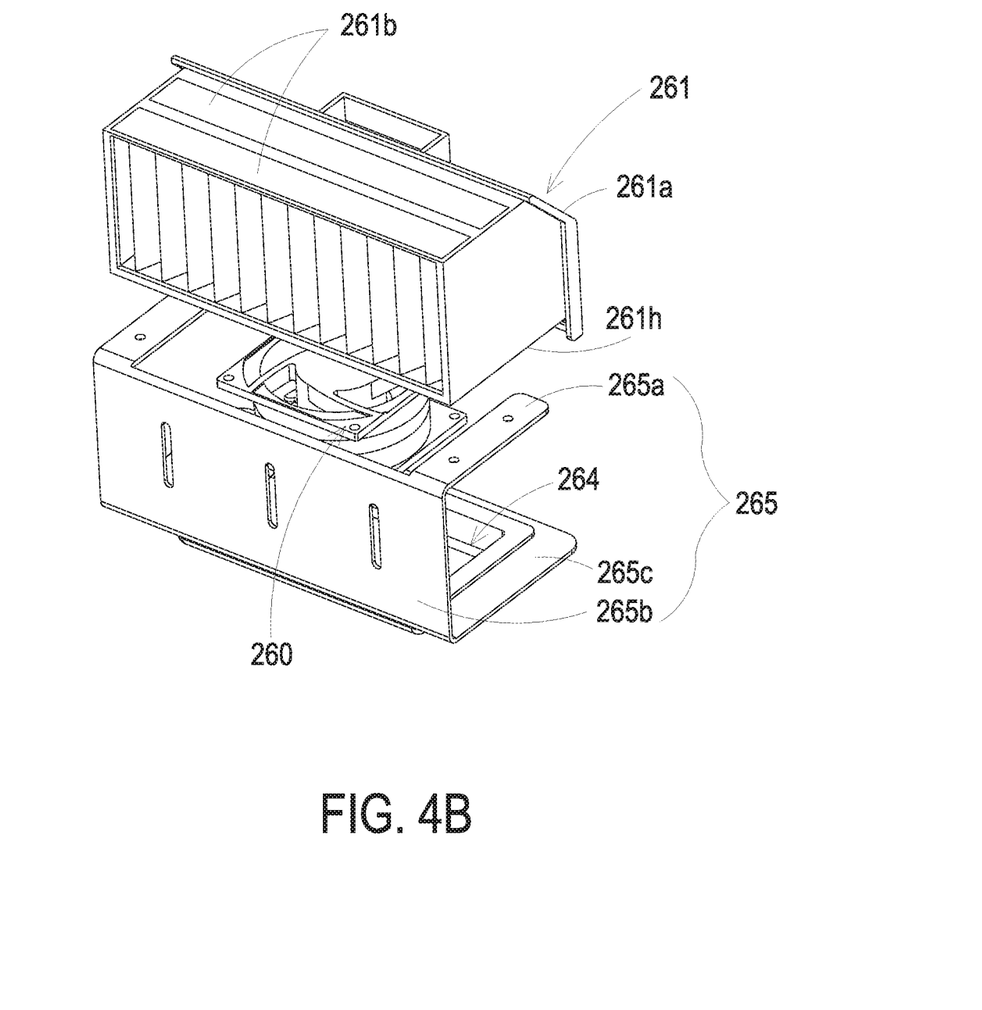
FIG. 4B is a schematic perspective view illustrating the main body, the suction device and the bracket of the powder filtering mechanism as shown in FIG. 4A, in which a portion of the outer shell of the main body is not shown.

FIG. 4B is a schematic perspective view illustrating the main body, the suction device and the bracket of the powder filtering mechanism as shown in FIG. 3A, in which a portion of the outer shell of the main body is not shown. After a portion of the outer shell 261a of the main body 261 is removed, the plural filters 261b within the accommodation space 261e of the outer shell 261a are shown. In an embodiment, the first filter of the plural filters 261b is a primary filter that is vertically fixed in the accommodation space 261e, and the other filters of the plural filters 261b are activated carbon filters, high-performance high-density filters or electrostatic filters. The number of the plural filters is determined according to the type of the flying dust or pollutant. Moreover, the plural filters 261b are removable. After the plural filters 261b are removed from the main body 261, the plural filters 261b can be washed or replaced with new ones. Accordingly, it's no need to change either all of the plural filters 261b or the main body 261 if the plural filters 261b need to be washed or replaced.

Please refer to FIG. 2 again. When the powder-spreading process is performed or after the rapid prototyping process is completed, the excess construction powder possibly flies in the working environment of the three-dimensional rapid prototyping apparatus 2. In accordance with the present invention, the larger-sized powdery particles of the excess construction powder are pushed to the powder inlet 250 by the powder-spreading mechanism, and thus the larger-sized powdery particles of the excess construction powder directly fall down to the excess powder collector 25. Moreover, during the operation of the suction device 260 of the powder filtering mechanism 26, the main body 261, the duct 262 and the connecting part 263 of the powder filtering mechanism 26 are in a negative pressure state. Consequently, the flying dust is inhaled into the powder inlet 250. Since the shielding part 263a and the brush structure 263c are located at the suction port 263b of the connecting part 263, the larger-sized powdery particles of the flying dust are initially blocked by the shielding part 263a and the brush structure 263c. That is, the larger-sized powdery particles of the flying dust directly fall down to the bottom of the excess powder collector 25 through the communication tube 251. Consequently, only the smaller-sized powdery particles of the flying dust are allowed to be introduced into the powder filtering mechanism 26 through the suction port 263b of the connecting part 263. After the smaller-sized powdery particles of the flying dust are introduced into the main body 261 through the connecting part 263, the duct 262 and the entrance 261c, the smaller-sized powdery particles of the flying dust are filtered by the plural filters 261b in multiple filtering steps. The micro-particles of the flying dust passing through the plural filters 261b drop down to the micro-particle adsorption structure 266 through the exit 261d of the main body 261 and the suction device 260. Then, the micro-particles of the flying dust are absorbed by the micro-particle adsorption structure 266. Consequently, the flying dust in the working environment is largely reduced, and the dust pollution problem is effectively solved.

From the above descriptions, the present invention provides the three-dimensional rapid prototyping apparatus and the powder filtering mechanism. The suction device of the powder filtering mechanism is used for providing negative pressure airflow. Moreover, the shielding part, the brush structure, the sealed main body and the plural filters of the powder filtering mechanism are effective to absorb and filter the flying dust in the working environment. By using the powder filtering mechanism of the present invention, the problem of generating the flying dust in the working environment of the three-dimensional rapid prototyping apparatus will be overcome, and the unpleasant odor of the flying dust can be effectively eliminated.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A three-dimensional rapid prototyping apparatus, comprising:
   a construction platform comprising a construction chamber and a powder feeder;
   a movable platform disposed over the construction platform, wherein when the movable platform is moved relative to the construction platform, construction powder is pushed from the powder feeder to the construction chamber;
   a printing module disposed on the movable platform, wherein when the printing module is moved with the movable platform to a position over the construction chamber, a rapid prototyping process is performed in the construction chamber;
   a powder inlet exposed to the construction platform;
   an excess powder collector in communication with the powder inlet, wherein after the rapid prototyping process is completed, excess construction powder is collected by the excess powder collector; and
   a powder filtering mechanism comprising:
      a connecting part in communication with the powder inlet;
      a main body comprising an outer shell, an entrance and an exit, wherein an accommodation space is defined within the outer shell, and plural filters are accommodated within the accommodation space;
      a duct in communication with the connecting part and the entrance of the main body;
      a suction device in communication with the exit of the main body; and
      a bracket connected with a bottom surface of the main body, wherein a micro-particle adsorption structure is supported by the bracket,
   wherein during operation of the suction device, flying dust of the excess construction powder is inhaled into the powder inlet, and a portion of the flying dust is transferred to the accommodation space of the main body through the connecting part and the duct, wherein after the portion of the flying dust is introduced into the accommodation space of the main body, the portion of the flying dust is filtered by the plural filters in multiple filtering steps, and micro-particles of flying dust passing through the plural filters are transferred to the micro-particle adsorption structure through the exit of the main body and the suction device so as to be adsorbed by the micro-particle adsorption structure.

2. The three-dimensional rapid prototyping apparatus according to claim 1, further comprising a construction platform and a communication tube, wherein the construction platform is installed on a construction base, and the excess powder collector is disposed within the construction base, wherein a first end of the communication tube is in communication with the powder inlet, and a second end of the communication tube is in communication with the excess powder collector.

3. The three-dimensional rapid prototyping apparatus according to claim 2, wherein the connecting part has a suction port, wherein the suction port is installed in a sidewall of the communication tube, and the suction port is in communication with the powder inlet.

4. The three-dimensional rapid prototyping apparatus according to claim 3, wherein the powder filtering mechanism further comprises a shielding part, wherein the shielding part is protruded from a top edge of the suction port of the connecting part, and larger-sized powdery particles of the flying dust are blocked by the shielding part.

5. The three-dimensional rapid prototyping apparatus according to claim 3, wherein the powder filtering mechanism further comprises a brush structure, wherein the brush structure is located at the suction port of the connecting part, and larger-sized powdery particles of the flying dust are blocked by the shielding part.

6. The three-dimensional rapid prototyping apparatus according to claim 1, wherein the plural filters in the main body comprise a primary filter and at least one of an activated carbon filter, a high-performance high-density filter and an electrostatic filter.

7. The three-dimensional rapid prototyping apparatus according to claim 1, wherein the micro-particle adsorption structure is a moisture-containing fiber structure, wherein the micro-particles of flying dust passing through the plural filters are further absorbed by the micro-particle adsorption structure.

8. A powder filtering mechanism for filtering flying dust from a three-dimensional rapid prototyping apparatus, the powder filtering mechanism comprising:
a connecting part in communication with a powder inlet of the three-dimensional rapid prototyping apparatus;
a main body comprising an outer shell, an entrance and an exit, wherein an accommodation space is defined within the outer shell, and plural filters are accommodated within the accommodation space;
a duct in communication with the connecting part and the entrance of the main body;
a suction device in communication with the exit of the main body; and
a bracket connected with a bottom surface of the main body, wherein a micro-particle adsorption structure is supported by the bracket,
wherein during operation of the suction device, the flying dust is inhaled into the powder inlet, and a portion of the flying dust is transferred to the accommodation space of the main body through the connecting part and the duct, wherein after the portion of the flying dust is introduced into the accommodation space of the main body, the portion of the flying dust is filtered by the plural filters in multiple filtering steps, and micro-particles of flying dust passing through the plural filters are transferred to the micro-particle adsorption structure through the exit of the main body and the suction device so as to be adsorbed by the micro-particle adsorption structure.

9. The powder filtering mechanism according to claim 8, wherein the powder inlet is further connected with a communication tube, and the communication tube is further in communication with an excess powder collector, wherein the connecting part has a suction port installed in a sidewall of the communication tube, and the suction port is in communication with the powder inlet.

10. The powder filtering mechanism according to claim 9, further comprising a shielding part, wherein the shielding part is protruded from a top edge of the suction port of the connecting part, larger-sized powdery particles of the flying dust are blocked by the shielding part.

11. The powder filtering mechanism according to claim 9, further comprising a brush structure, wherein the brush structure is located at the suction port of the connecting part, and larger-sized powdery particles of the flying dust are blocked by the shielding part.

12. The powder filtering mechanism according to claim 8, further comprising a support tray, wherein the support tray is disposed on the bracket, and the micro-particle adsorption structure is supported by the support tray.

13. The powder filtering mechanism according to claim 8, wherein the plural filters in the main body comprise a primary filter and at least one of an activated carbon filter, a high-performance high-density filter and an electrostatic filter.

14. The powder filtering mechanism according to claim 8, wherein the micro-particle adsorption structure is a moisture-containing fiber structure, wherein the micro-particles of flying dust passing through the plural filters are further absorbed by the micro-particle adsorption structure.

* * * * *